(12) United States Patent
Nuzzo

(10) Patent No.: US 9,580,135 B1
(45) Date of Patent: Feb. 28, 2017

(54) VEHICLE SUSPENSION SYSTEM PACKING APPARATUS

(71) Applicant: Thomas Peter Nuzzo, San Francisco, CA (US)

(72) Inventor: Thomas Peter Nuzzo, San Francisco, CA (US)

( * ) Notice: Subject to any disclaimer, the term of this patent is extended or adjusted under 35 U.S.C. 154(b) by 37 days.

(21) Appl. No.: 14/828,492

(22) Filed: Aug. 17, 2015

(51) Int. Cl.
| | | |
|---|---|---|
| B62K 21/02 | (2006.01) | |
| B62K 25/04 | (2006.01) | |
| B62K 25/08 | (2006.01) | |
| B62K 25/10 | (2006.01) | |
| B62K 25/06 | (2006.01) | |

(52) U.S. Cl.
CPC ............. *B62K 25/08* (2013.01); *B62K 21/02* (2013.01); *B62K 25/04* (2013.01); *B62K 25/06* (2013.01); *B62K 25/10* (2013.01); *B62K 2025/047* (2013.01)

(58) Field of Classification Search
CPC .. B62K 2025/042; B62K 21/00; B62K 21/02; B62K 21/04; B62K 25/00; B62K 25/04; B62K 25/06; B62K 25/08; B62K 25/10; B62K 25/12
USPC .... 280/275, 276, 277, 279, 280, 281.1, 283, 280/284, 288
See application file for complete search history.

(56) References Cited

U.S. PATENT DOCUMENTS

| | | | | |
|---|---|---|---|---|
| 4,735,276 A | * | 4/1988 | Burton | B62K 25/08 180/219 |
| 5,301,969 A | * | 4/1994 | Bynoe | B62M 1/20 280/221 |
| 6,149,173 A | * | 11/2000 | Bynoe | B62K 17/00 280/276 |
| 6,220,614 B1 | * | 4/2001 | O'Neil | B62K 17/00 280/220 |
| 6,631,915 B2 | * | 10/2003 | Barefoot | B62K 25/08 280/276 |
| 9,068,616 B1 | * | 6/2015 | Serbu | B60G 15/062 |
| 9,079,628 B2 | * | 7/2015 | O'Neil | B62K 3/02 |
| 2005/0151360 A1 | * | 7/2005 | Bertrand | A61G 5/043 280/755 |
| 2005/0184476 A1 | * | 8/2005 | Hamm | B60G 7/006 280/5.502 |

* cited by examiner

*Primary Examiner* — Joseph Rocca
*Assistant Examiner* — Marc A Scharich

(57) ABSTRACT

A vehicle suspension packing apparatus for providing undamped suspension system rebound in a vehicle suspension system includes a ratchet mechanism including a shaft having a longitudinal rack of engageable teeth and a pivoting pawl engageable with one of the rack of engageable teeth, engagement of the pivoting pawl with one of the rack of engageable teeth holding the shaft in an engaged position to thereby hold a coil spring in a compressed configuration, and disengagement of the pivoting pawl from the one of the rack of engageable teeth releasing stored system spring energy to thereby provide undamped suspension system rebound.

9 Claims, 5 Drawing Sheets

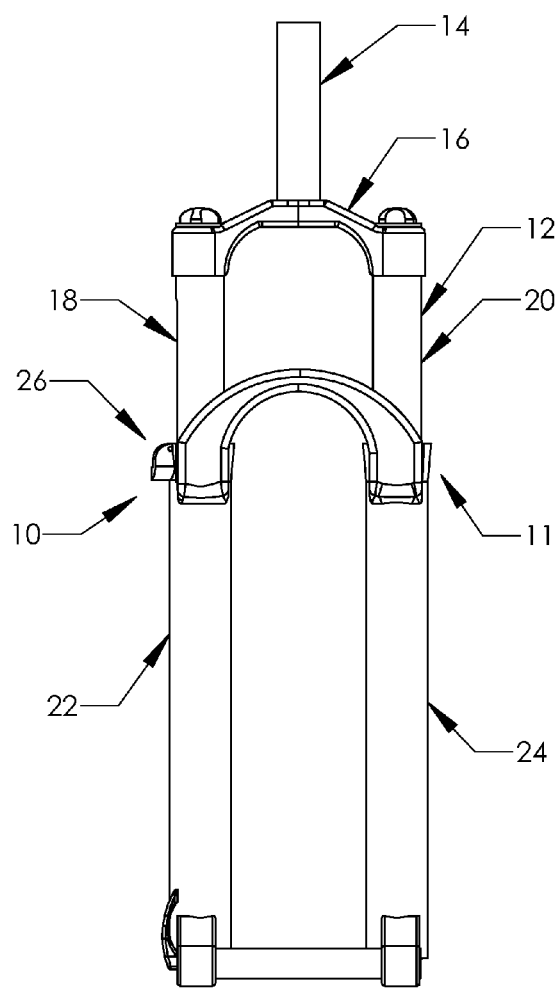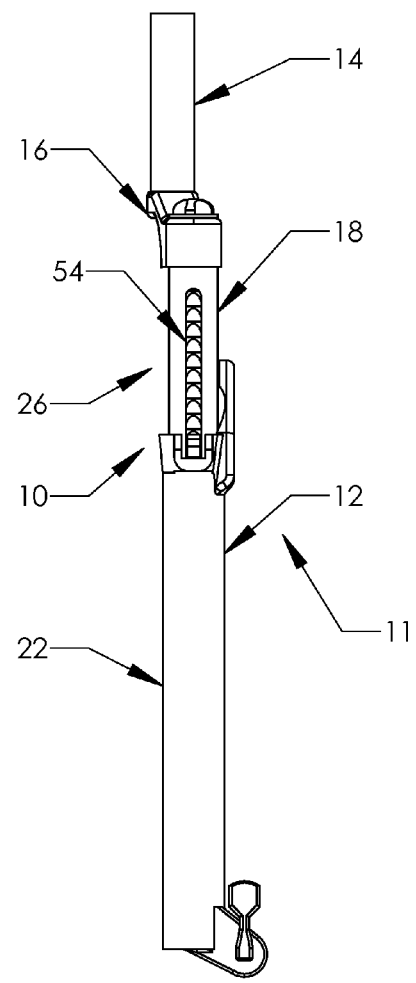
FIG. 1                    FIG. 2

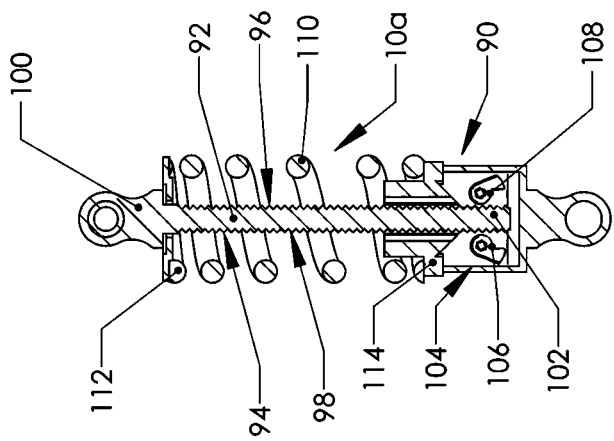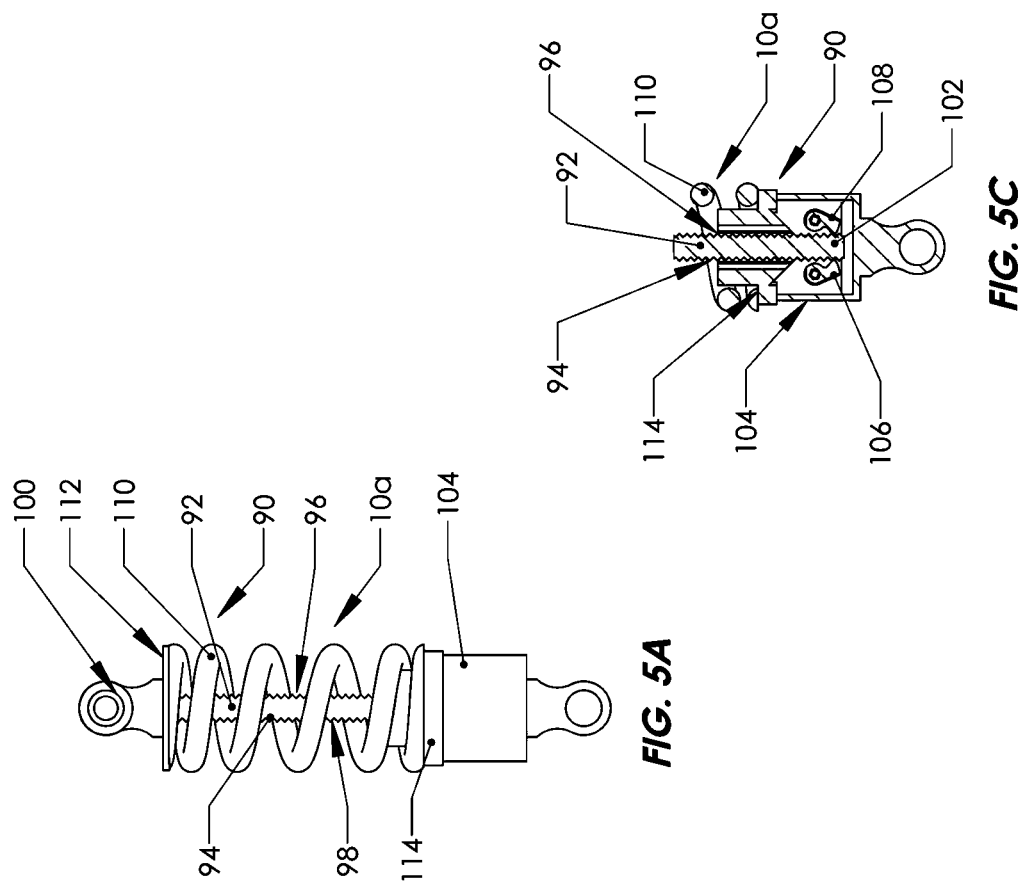
FIG. 5B
FIG. 5C
FIG. 5A

VEHICLE SUSPENSION SYSTEM PACKING APPARATUS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING, TABLE OR COMPUTER PROGRAM LISTING APPENDIX

Not applicable.

BACKGROUND OF THE INVENTION

1. Field of the Invention

Embodiments of the present invention relate generally to vehicle suspension systems. More particularly, certain embodiments relate to a vehicle suspension system packing apparatus.

2. Description of the Related Art

Vehicle suspension systems are designed to cushion shocks transmitted to a vehicle as it encounters bumps and depressions formed on a road or other riding surface. Typical vehicle suspension systems are optimized to keep the vehicle's tires on the road or riding surface as much as possible in order to contribute to the vehicle's handling and braking capabilities. However, it is desirable in some circumstances to use stored suspension system spring energy to propel the vehicle's tires off the road or riding surface in order to make the vehicle "jump" or "buck". This capability is particularly desirable in the case of off-road vehicles such as mountain bikes, dirt bikes and all-terrain vehicles where the rider or driver may want to jump over obstacles or perform other stunts.

BRIEF SUMMARY OF THE DISCLOSURE

In accordance with the disclosure, a vehicle suspension system packing apparatus comprises a means for providing undamped suspension rebound in a vehicle suspension system. The means for providing undamped suspension rebound includes a ratchet mechanism operable to ratchet the suspension system into a packed configuration. As compressive forces are exerted upon the suspension system, the ratchet mechanism may ratchet the suspension system into the packed configuration in which the suspension system spring energy is stored in a coil spring held in a compressed state by the ratchet mechanism. The ratchet mechanism is also operable to instantaneously release the stored system spring energy to provide undamped rebound in the suspension system and to transfer the stored energy to the suspension system and vehicle.

In one aspect of the disclosure, the vehicle suspension system packing apparatus can be used in a front suspension system of a handlebar-steered vehicle such as a bicycle or motorcycle. A ratchet mechanism includes a shaft having a longitudinal rack of engageable teeth, the shaft fixedly disposed inside a stanchion tube of a first leg of the front suspension fork, the stanchion tube being slidably disposed within a slider tube of the suspension system. A shaft bottom end abuts a coil spring disposed in a bottom portion of the slider tube. The ratchet mechanism also includes a pivoting pawl disposed proximate the top of the slider tube and selectively engageable with the engageable teeth through a slot formed along an extent of the stanchion tube. As compressive forces are exerted upon the front suspension system, the pivoting pawl may engage one of the engageable teeth as the engageable teeth traverse downwards past the pivoting pawl to thereby hold the shaft in an engaged position. In the engaged position the coil spring is held in a compressed state within the slider tube between the shaft bottom end and the bottom of the slider tube. Disengagement of the pivoting pawl from the one of the engageable teeth frees the shaft and releases the stored system spring energy to provide undamped suspension system rebound and thereby transfer the stored energy to the front suspension system and to the front of the bicycle or motorcycle.

In another aspect of the disclosure, the vehicle suspension system packing apparatus can be used in the rear suspension system of a handlebar-steered vehicle such as a bicycle or motorcycle. A ratchet mechanism includes a shaft having engageable teeth, the shaft pivotally attached at one end to a rear suspension system bracket and slidingly receivable within a housing at the other end. A pair of pivoting pawls are disposed in the housing for selective engagement with the engageable teeth. As compressive forces are exerted upon the rear suspension system, the pivoting pawls may engage ones of successive engageable teeth as the engageable teeth traverse downwards past the pivoting pawls to thereby hold the shaft in an engaged position. A coil spring surrounds the shaft and is held between a top of the housing and a shaft top shoulder. In the engaged position the coil spring is held in a compressed state between the top of the housing and the shaft top shoulder. Disengagement of the pivoting pawls from the ones of the engageable teeth frees the shaft and releases the stored system spring energy to provide for undamped suspension system rebound and thereby transfer the stored energy to the rear suspension system bracket and to the rear of the bicycle or motorcycle.

BRIEF DESCRIPTION OF THE DRAWING FIGURES

FIG. 1 is a front elevation view of a vehicle suspension system packing apparatus in use with a front vehicle suspension system in accordance with an embodiment of the present disclosure;

FIG. 2 is a side elevation view of the vehicle suspension system packing apparatus of FIG. 1;

FIG. 5A is a front elevation view of a vehicle suspension system packing apparatus shown in an uncompressed configuration in accordance with another aspect of the present invention;

FIG. 5B is a cross-sectional view of the vehicle suspension system packing apparatus of FIG. 5A showing a pair of pivoting pawls in a disengaged position;

FIG. 5C is a partial view of the vehicle suspension system packing apparatus of FIG. 5A showing the pair of pivoting pawls in an engaged position.

Figure 3A:
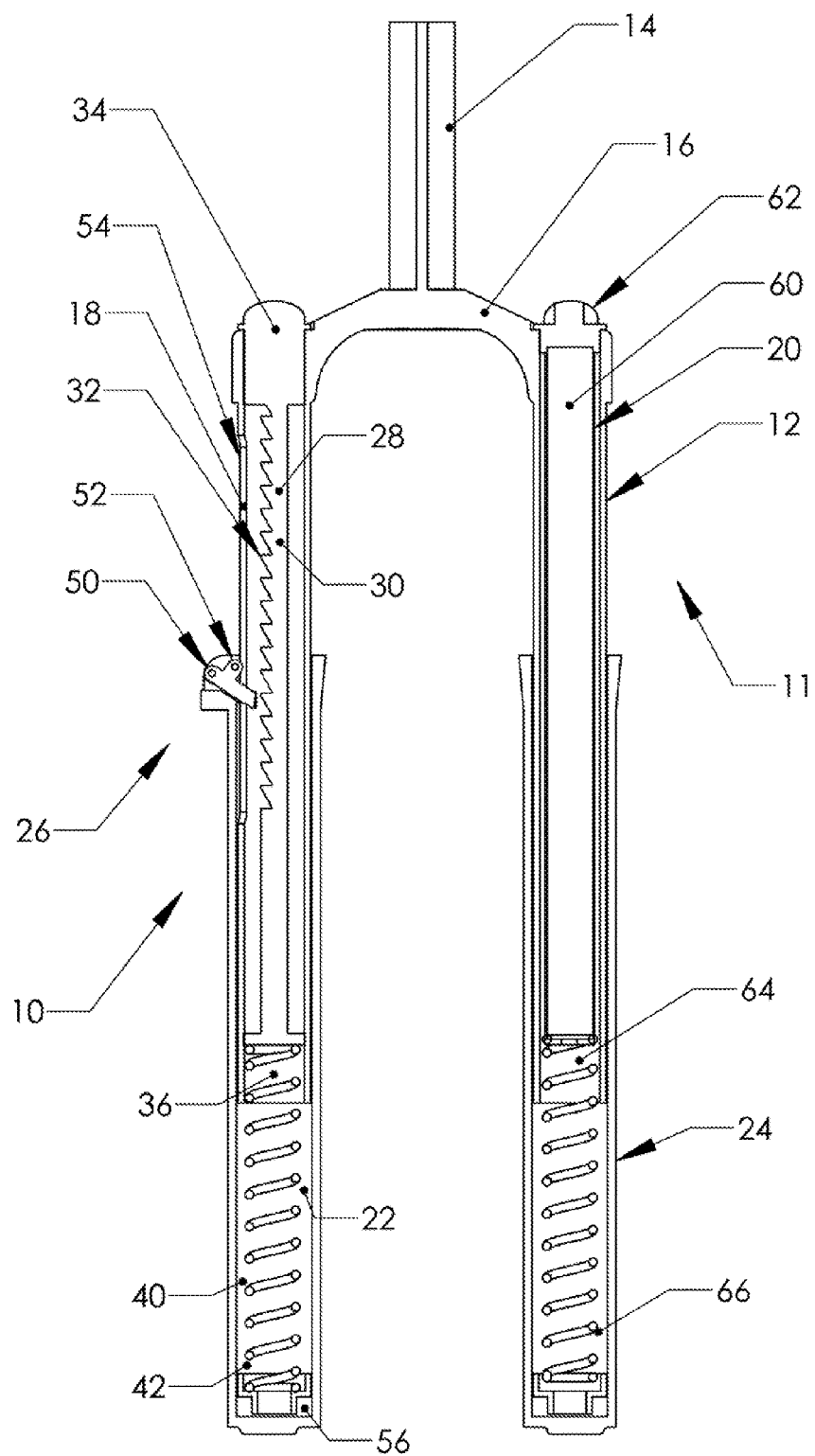
FIG. 3A is a cross-sectional view of the vehicle suspension system packing apparatus shown in an uncompressed configuration.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve the understanding of various embodiments of the present disclosure. Also, common but well-known elements that are useful or necessary in a commercially feasible embodiment are often not depicted in order to facilitate a less obstructed view of these various embodiments of the present disclosure.

DETAILED DESCRIPTION OF THE INVENTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example", or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Further, reference throughout this specification to "top", "upper", "upward" and "upwardly" mean toward the upper portion of the vehicle. Reference to "bottom", "lower", "loward", "lowardly" and "downwardly" mean toward the lower portion of the vehicle when the vehicle is in an ordinary riding orientation.

The present invention is directed to a vehicle suspension system packing apparatus that can be used on any vehicle but that is particularly adapted to be used with a handlebar-steered vehicle such as a bicycle or motorcycle. The packing apparatus can be used, for example in the front fork suspension system and in the rear suspension system of such vehicles. The packing apparatus includes a means for providing undamped suspension rebound in a vehicle suspension system. Instantaneous release of stored suspension system spring energy provides undamped rebound in the suspension system and transfers the stored energy to the suspension system and vehicle.

The means for providing undamped suspension system rebound includes a ratchet mechanism operable to ratchet the suspension system into a packed configuration. As compressive forces are exerted upon the suspension system, the ratchet mechanism may ratchet the suspension system into the packed configuration in which the suspension system spring energy is stored in a coil spring held in a compressed state by the ratchet mechanism. The ratchet mechanism is also operable to instantaneously release the stored system spring energy to provide for undamped suspension system rebound and thereby transfer the stored energy to the suspension system and vehicle.

In accordance with an example of the disclosure, a vehicle suspension system packing apparatus 10 can be used in cooperation with a front fork suspension system 11 of a handlebar-steered vehicle (FIG. 1 and FIG. 2). The front fork suspension system 11 conventionally includes a front fork 12 having a steering tube 14 connected to a crown 16. First and second stanchion tubes 18 and 20 connect to the crown 16 and are slidingly receiveable in first and second slider tubes 22 and 24 respectively.

Figure 3B:
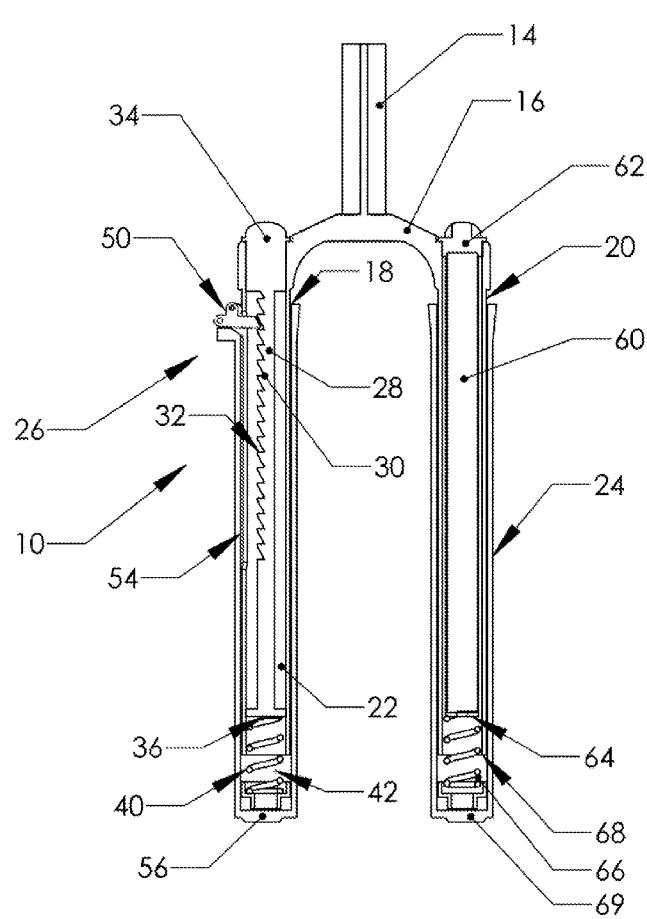
FIG. 3B is a cross-sectional view of the vehicle suspension system packing apparatus shown in a compressed configuration.
Figure 4B:
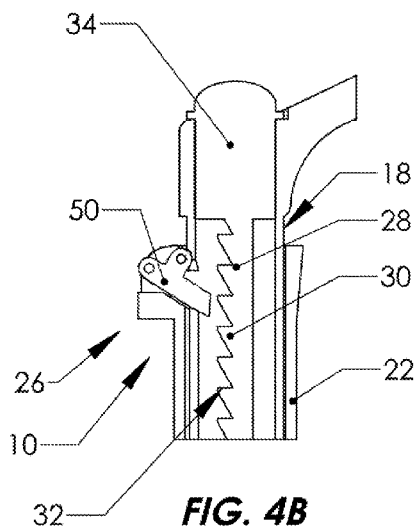
FIG. 4B is a partial view of the vehicle suspension system packing apparatus of FIG. 3A showing a position of the pivoting pawl in a disengaged position.
Figure 4A:
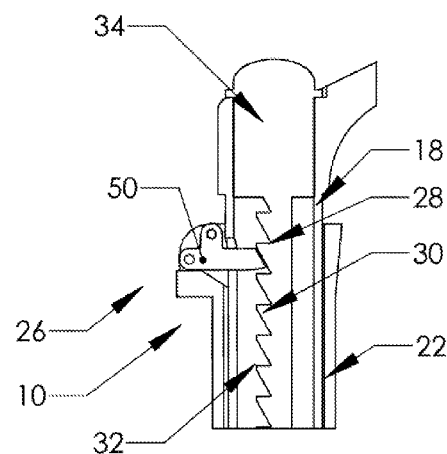
FIG. 4A is a partial view of the vehicle suspension system packing apparatus of FIG. 3B showing a position of a pivoting pawl in an engaged position.
Figure 6:
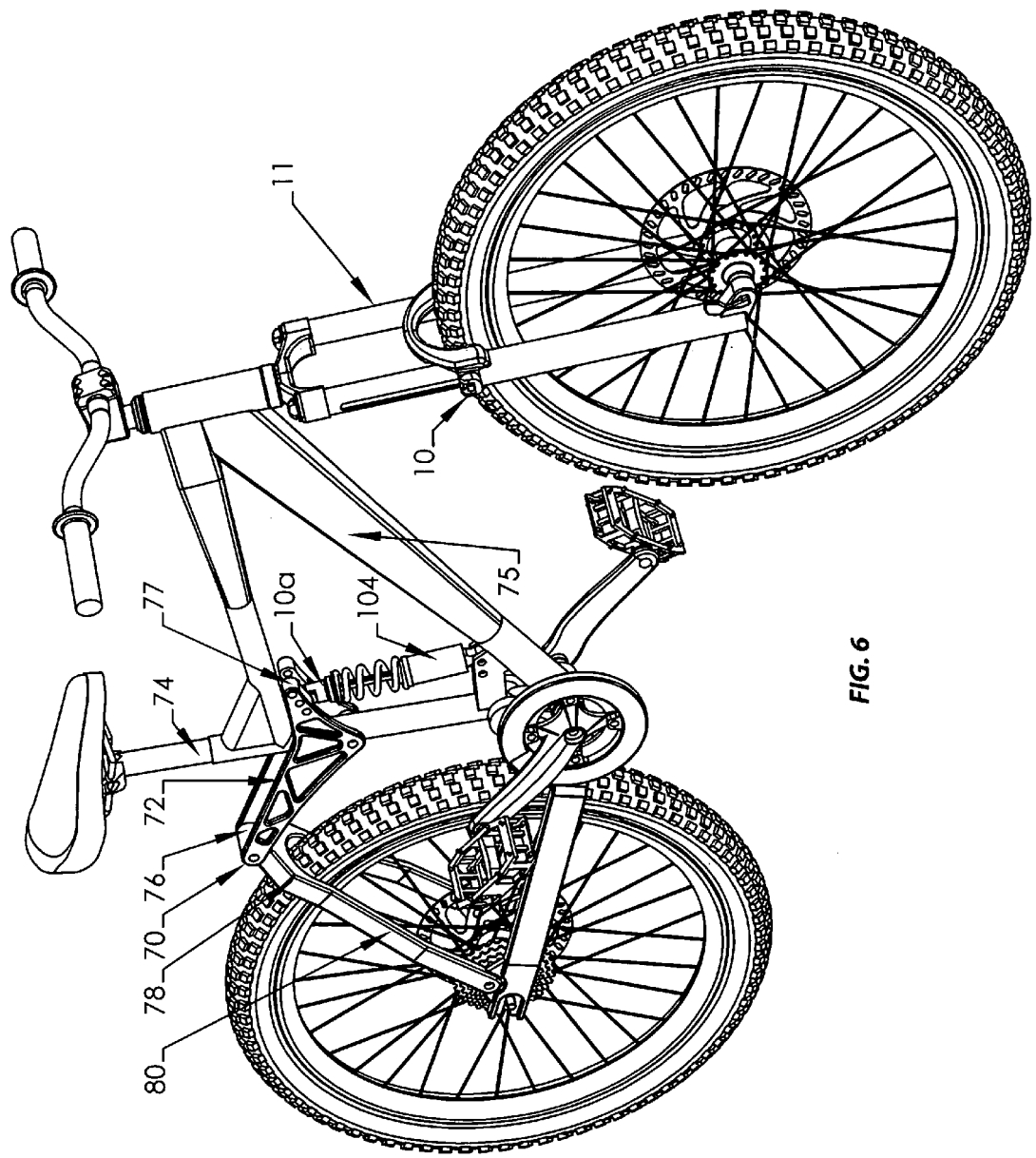
FIG. 6 is a perspective view of a handlebar-steered vehicle.

The vehicle suspension system packing apparatus 10 includes a means for providing undamped suspension system rebound to the front fork suspension system 11 and may include a ratchet mechanism 26. The ratchet mechanism 26 includes a shaft 28 having a longitudinal rack 30 of engageable teeth 32 as illustrated in FIG. 3A and FIG. 3B. The shaft 28 has a top end 34 fixedly attached to the inside of the first stanchion tube 18. A shaft bottom end 36 abuts a coil spring 40 disposed in a bottom portion 42 of the first slider tube 22. The ratchet mechanism 26 further includes a pivoting pawl 50 disposed proximate a top 52 of the first slider tube 22 that is selectively engageable with one of the engageable teeth 32 through a slot 54 formed along an extent of the first stanchion tube 18 (FIG. 1). As compressive forces are exerted upon the front fork suspension system 11, the vehicle suspension system packing apparatus 10 may transit from an unpacked configuration (FIG. 3A) to a packed configuration (FIG. 3B). As the shaft 28 is forced downwardly through the first slider tube 22, the pivoting pawl 50 may engage one of the engageable teeth 32 (FIG. 4A) to thereby hold the shaft 28 in an engaged position in which the vehicle suspension system packing apparatus 10 is in the packed configuration. In the engaged position the coil spring 40 is held in a compressed state within the first slider tube 22 between the shaft bottom end 36 and a bottom wall 56 of the first slider tube 22. Instantaneous disengagement of the pivoting pawl 50 from the one of the engageable teeth 32 (FIG. 4B) frees the shaft 28 to provide undamped suspension system rebound and releases the stored suspension system spring energy to thereby transfer the stored energy to the front fork suspension system 11 and to the front of the bicycle or motorcycle. Release of the stored suspension system spring energy to the front fork suspension system 11 is operable to cause the front of the bicycle or motorcycle to "jump".

The exemplary front fork suspension system 11 may also include a ratchet mechanism including a shaft 60 having a top end 62 fixedly attached to a top of the second stanchion tube 20. A shaft bottom end 64 abuts a second coil spring 66 disposed in a bottom portion 68 of the second slider tube 24. In the engaged position the second coil spring 66 is held in a compressed state within the second slider tube 24 between the shaft bottom end 64 and a bottom wall 69 of the second slider tube 24 to provide additional stored suspension system spring energy and a balanced load to the front fork suspension system 11. Disengagement of a pivoting pawl (not shown) from one of the shaft engageable teeth (not shown) frees the shaft 60 to provide undamped suspension system rebound to the front fork suspension system 11.

In accordance with another example of the disclosure, a vehicle suspension system packing apparatus 10a can be used in cooperation with a rear fork suspension system 70 of handlebar-steered vehicle (FIG. 5A, FIG. 5B, FIG. 5C and FIG. 6). The rear fork suspension system 70 includes a pivoting bracket 72 pivotally attached to a vehicle seat tube 74. A first end 76 of the pivoting bracket 72 is pivotally attached to a bridge 78 of a rear suspension system fork 80. The rear suspension system fork 80 tubes terminate in rear suspension system fork dropouts.

The vehicle suspension system packing apparatus 10a includes a means for providing undamped suspension system rebound to the rear fork suspension system 70 and may include a ratchet mechanism 90. The ratchet mechanism 90 includes a shaft 92 having two opposed longitudinal racks 94 and 96 of engageable teeth 98. The shaft 92 has a top end 100 pivotally attached to a second end 77 of the pivoting bracket. A shaft bottom end 102 is slidingly receivable within a housing 104 pivotally attached to a frame down tube 75. The ratchet mechanism 90 further includes a pair of pivoting pawls 106 and 108 disposed within the housing 104, the pivoting pawls 106 and 108 selectively engageable with ones of the engageable teeth 98 of longitudinal racks 94 and 96 respectively. As compressive forces are exerted upon the rear fork suspension system 70, the vehicle suspension system packing apparatus 10a may transit from an unpacked configuration (FIG. 5A) to a packed configuration (FIG. 5C). As the shaft 92 is forced downwardly through the housing 104, the pivoting pawls 106 and 108 may engage ones of the engageable teeth 98 of longitudinal racks 94 and 96 respectively to thereby hold the shaft 92 in an engaged position in which the vehicle suspension system packing apparatus 10a is in the packed configuration. In the engaged position a coil spring 110 is held in a compressed state between a shaft top shoulder 112 and a top 114 of the housing 104. Instantaneous disengagement of the pivoting pawls 106 and 108 from the ones of the engageable teeth 98 of longitudinal racks 94 and 96 (FIG. 5B) frees the shaft 92 to provide undamped suspension system rebound and releases the stored suspension system spring energy to thereby transfer the stored energy to the rear fork suspension system 70 and to the rear of the bicycle or motorcycle. Release of the stored suspension system spring energy to the rear fork suspension system 70 is operable to cause the rear of the bicycle or motorcycle to "buck" or "jump".

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

I claim:

1. A vehicle suspension system packing apparatus for providing undamped suspension system rebound in a vehicle suspension system, the vehicle suspension system packing apparatus comprising:

a ratchet mechanism disposed in a suspension component of the vehicle suspension system, the suspension component operably mounted to a vehicle, the ratchet mechanism including a shaft comprising a longitudinal rack of engageable teeth and a pivoting pawl engageable with one of the engageable teeth, the suspension component including at least a coil spring having at least a portion thereof configured to contact the shaft or coil around the shaft, wherein engagement of the pivoting pawl with the one of the engageable teeth maintains the shaft in an engaged position to hold the coil spring in a compressed state, and wherein disengagement of the pivoting pawl from the one of the engageable teeth frees the shaft from the engaged position and releases stored system spring energy from the coil spring to provide undamped suspension system rebound in the vehicle suspension system.

2. The vehicle suspension system packing apparatus of claim 1, wherein the vehicle suspension system is a front vehicle suspension system, the suspension component is part of the front vehicle suspension system, and wherein the shaft of the ratchet mechanism further comprises a top end fixedly attached to an inside of a first stanchion tube of the suspension component, the first stanchion tube being slidingly receivable in a first slider tube of the suspension component, and the shaft further comprises a bottom end abutting the coil spring, the coil spring being disposed in a bottom portion of the first slider tube of the suspension component.

3. The vehicle suspension system packing apparatus of claim 2, wherein the pivoting pawl of the ratchet mechanism is disposed proximate a top end of the first slider tube of the suspension component and is engageable with the one of the engageable teeth through a slot formed in the first stanchion tube of the suspension component.

4. The vehicle suspension system packing apparatus of claim 3, wherein the coil spring is held in the compressed state between the bottom end of the shaft and a bottom end of the first slider tube of the suspension component.

5. The vehicle suspension system packing apparatus of claim 4, wherein the front vehicle suspension system is a front suspension system of a handlebar-steered vehicle.

6. The vehicle suspension system packing apparatus of claim 5, wherein the ratchet mechanism is disposed in a first leg of the front suspension system, the first leg including at least the first stanchion tube of the suspension component.

7. The vehicle suspension system packing apparatus of claim 6, wherein the shaft of the ratchet mechanism is a first shaft, the longitudinal rack of engageable teeth is a first longitudinal rack of engageable teeth, the pivoting pawl is a first pivoting pawl, the ratchet mechanism is a first ratchet mechanism, and the coil spring of the suspension component is a first coil spring, and wherein the vehicle suspension system packing apparatus further comprises a second ratchet mechanism disposed in a second leg of the front suspension system, the second leg including at least a second stanchion tube of the suspension component, the second ratchet mechanism including a second shaft comprising a second longitudinal rack of engageable teeth and a second pivoting pawl engageable with one of the engageable teeth of the second longitudinal rack of engageable teeth, wherein engagement of the second pivoting pawl with the one of the engageable teeth of the second longitudinal rack of engageable teeth maintains the second shaft in an engaged position to hold a second coil spring of the suspension component in a compressed state, and wherein disengagement of the second pivoting pawl from the one of the engageable teeth of the second longitudinal rack of engageable teeth frees the second shaft from the engaged position and releases stored system spring energy from the second coil spring to provide undamped suspension system rebound in the front suspension system.

8. The vehicle suspension system packing apparatus of claim 1, wherein the longitudinal rack of engageable teeth is a first longitudinal rack of engageable teeth, and wherein the shaft of the ratchet mechanism further comprises a second longitudinal rack of engageable teeth, a top end pivotally attached to an end of a vehicle rear suspension system pivoting bracket, and a bottom end slidingly receivable within a housing of the suspension component, the housing pivotally attached to a vehicle frame down tube, and the coil spring is disposed so as to coil around a portion of the shaft between a top end of the housing and a top shoulder of the shaft.

9. The vehicle suspension system packing apparatus of claim 8, wherein the pivoting pawl is a first pivoting pawl, and the ratchet mechanism further includes a second pivoting pawl, the first and second pivoting pawls being oppositely disposed in the housing adjacent to the respective first and second longitudinal racks of engageable teeth to engage respective ones of the engageable teeth of the first and second longitudinal racks of engageable teeth.

\* \* \* \* \*